US009896245B1

(12) United States Patent
Sanchez

(10) Patent No.: US 9,896,245 B1
(45) Date of Patent: Feb. 20, 2018

(54) SLIDING DOOR AND TRACK ASSEMBLY

(71) Applicant: Maricela Sanchez, Corpus Christi, TX (US)

(72) Inventor: Maricela Sanchez, Corpus Christi, TX (US)

(*) Notice: Subject to any disclaimer, the term of this patent is extended or adjusted under 35 U.S.C. 154(b) by 0 days.

(21) Appl. No.: 14/853,344

(22) Filed: Sep. 14, 2015

Related U.S. Application Data

(60) Provisional application No. 62/050,595, filed on Sep. 15, 2014.

(51) Int. Cl.
| | |
|---|---|
| B65D 43/00 | (2006.01) |
| B65D 43/12 | (2006.01) |
| E05C 19/02 | (2006.01) |
| E05C 19/10 | (2006.01) |
| E05C 17/62 | (2006.01) |
| E05D 15/16 | (2006.01) |
| B65D 25/28 | (2006.01) |

(52) U.S. Cl.
CPC ............. *B65D 43/12* (2013.01); *B65D 25/28* (2013.01); *E05C 19/02* (2013.01); *E05C 19/10* (2013.01); *E05D 13/06* (2013.01); *E05D 15/165* (2013.01); *B65D 2525/283* (2013.01)

(58) Field of Classification Search
CPC ........ B65D 43/12; B65D 43/20; B65D 25/28; B65D 2525/283; E05D 15/165; E05D 13/06; A01K 31/10; A01K 1/031; A01K 1/034; A01K 1/033
USPC ....................................... 220/212.5; D30/108
See application file for complete search history.

(56) References Cited

U.S. PATENT DOCUMENTS

| | | | | | |
|---|---|---|---|---|---|
| 391,145 | A | * | 10/1888 | Hardin ................. | B65D 5/6697 206/45.28 |
| 2,329,685 | A | * | 9/1943 | Baker ...................... | G01K 1/14 206/45.23 |
| 3,051,537 | A | * | 8/1962 | Diehl ................... | G03B 21/323 206/389 |
| 3,140,777 | A | * | 7/1964 | Gordan ................. | A45C 11/24 206/315.1 |
| 3,272,325 | A | * | 9/1966 | Schoenmakers ....... | B65D 25/02 206/387.1 |
| 3,532,211 | A | * | 10/1970 | Ulrich ................. | G11B 23/0233 206/387.1 |
| 3,627,398 | A | * | 12/1971 | Reese ................ | G11B 23/0236 206/387.12 |
| 3,904,150 | A | * | 9/1975 | Pinot ...................... | G11B 15/43 242/347.1 |
| 4,347,537 | A | * | 8/1982 | Schoettle ............. | G11B 15/295 206/389 |

(Continued)

*Primary Examiner* — J. Gregory Pickett
*Assistant Examiner* — Ernesto Grano
(74) *Attorney, Agent, or Firm* — M. Susan Spiering; Ferrell's PLLC

(57) ABSTRACT

The present invention discloses a simple, integral, sliding door track and hook assembly for a box or carrier. The door track and hook assembly includes a frame having a pair of tracks, a panel in slidable engagement with the pair of tracks, a slot present in the pair of tracks. The door (or panel) and track assembly is configured to arrest the panel in a fixed position when the panel is in an open arrangement without the need for additional hardware to keep it open. The invention eliminates or minimizes use of hardware. The hook portion of the assembly has no lock mechanism, and no special door is required.

10 Claims, 3 Drawing Sheets

(56) References Cited

U.S. PATENT DOCUMENTS

| | | | | |
|---|---|---|---|---|
| 4,496,050 | A * | 1/1985 | Kirchner | G11B 33/0455 16/360 |
| 4,535,888 | A * | 8/1985 | Nusselder | B65D 85/544 206/308.1 |
| 4,537,367 | A * | 8/1985 | Herrington | G11B 5/5504 242/347.1 |
| 4,615,461 | A * | 10/1986 | Liu | H05K 13/0084 206/45.23 |
| 4,627,531 | A * | 12/1986 | Clemens | G11B 33/0405 206/308.1 |
| 4,634,001 | A * | 1/1987 | Wakelin | B65D 11/12 206/308.3 |
| 4,655,342 | A * | 4/1987 | Brauner | G11B 33/0438 206/308.3 |
| 4,666,036 | A * | 5/1987 | Bourbon | A45C 11/24 206/425 |
| 4,676,375 | A * | 6/1987 | Willems | G11B 33/04 206/308.3 |
| 4,714,157 | A * | 12/1987 | Morrone | G11B 17/22 206/303 |
| D318,368 | S * | 7/1991 | Evans | D6/634 |
| 5,203,469 | A * | 4/1993 | Chang | B25H 3/003 206/372 |
| 5,353,947 | A * | 10/1994 | Zinnbauer | A45D 40/22 206/581 |
| 5,373,810 | A | 12/1994 | Martin | |
| 5,405,034 | A * | 4/1995 | Mittel, Jr. | B65D 43/20 215/322 |
| 5,411,134 | A * | 5/1995 | Temple | G11B 33/0433 206/309 |
| 5,573,120 | A * | 11/1996 | Kaufman | G11B 33/0427 206/308.1 |
| 5,732,820 | A * | 3/1998 | Tsai | B65D 43/20 206/369 |
| 5,813,531 | A * | 9/1998 | Kao | B25H 3/003 206/373 |
| 6,286,521 | B1 * | 9/2001 | Joulia | A45D 40/221 132/295 |
| 6,672,471 | B2 * | 1/2004 | Cross | B65D 43/20 206/267 |
| 6,840,009 | B2 | 1/2005 | Ronay | |
| 6,901,937 | B2 * | 6/2005 | Sebban | A45D 40/221 132/293 |
| 7,097,036 | B2 * | 8/2006 | Morita | G11B 23/0233 206/501 |
| 7,219,969 | B2 * | 5/2007 | Bezzubov | A47B 87/0276 312/107 |
| 8,333,276 | B2 * | 12/2012 | Richardson | G11B 33/0427 206/308.1 |
| 8,375,638 | B2 | 2/2013 | Martin | |
| 8,511,510 | B2 * | 8/2013 | Pratte | A61L 2/26 16/359 |
| 9,073,665 | B2 * | 7/2015 | Sanger | B65D 19/44 |
| 2015/0053691 | A1 * | 2/2015 | Sanger | B65D 19/44 220/544 |

\* cited by examiner

SLIDING DOOR AND TRACK ASSEMBLY

CROSS REFERENCE TO RELATED APPLICATION(S)

This is a non-provisional patent application based on U.S. Provisional Patent Application Ser. No. 62/050,595 titled "Sliding Door and Track Assembly", filed on Sep. 15, 2014, the priority of which is hereby claimed and the disclosure of which is incorporated herein by reference in its entirety.

BACKGROUND

Field of the Invention

The present invention generally relates to box carriers with sliding door systems. More specifically, the present invention relates to a design and mechanism for sliding the doors in such systems.

Description of Related Art

The use of sliding doors in box type carriers is very common. The sliding doors normally slide on a vertical track to move between an open position and a closed position. To keep these doors in open position, a user needs to hold the door with one hand and place materials or pets inside the box using the other hand, which is often cumbersome. To avoid this, current doors are provided with a track design using additional hardware and other devices to keep the doors open or closed. These doors often require two hands to operate the hardware. The hardware associated with current standard sliding doors is also susceptible to rusting and other malfunctions. Also, it has additional costs associated therewith. The hardware is not hidden, and hence it is not considered a good design solution from an aesthetic point of view.

U.S. Pat. No. 8,375,638 discloses a sliding panel system for solving the aforementioned problems; however, it contains mounting hardware and a roller assembly, thereby increasing the complexity and manufacturing costs. U.S. Pat. No. 5,373,810 discloses a lock-latch system for a cage door which relies on a wire latch to hold the door in position relative to the frame edge. U.S. Pat. No. 6,840,009 discloses a sliding double hung window structure with sash gliding tracks, wherein the sashes are balanced by suspended counter weights and guided by pins in gliding groves in the 2 vertical sides of a frame of the window structure. While various other methods have been used in the past for improving the design of sliding door, there still exists a need for simplifying the design and yet attain a more easily operable and aesthetically appealing door assembly.

SUMMARY

Disclosed is a door track and hook assembly for a box or container which is easy to use and simple to manufacture with minimal parts on the box. An object of the present invention is to eliminate the need for additional hardware in sliding door and track assemblies.

Another object of the present invention is to simplify the operation of door and track assemblies.

Embodiments of the invention provide a door track and hook assembly, which includes a frame including a top edge, opposing side edges, and a bottom edge. The opposing side edges of the frame have a pair of built in tracks, such that a door panel is capable of sliding in the tracks. A slot is built in the pair of tracks as one piece, to arrest the panel at a height measured from the bottom edge. An indentation is formed on the top edge of the frame so that the door panel can lie on the top edge of the frame in a flush or tilted manner.

The assembly can be used for a variety of applications such as a box, carrier, panels, windows, and generally any application which requires an opening which include a door slideably engaged with a track mechanism. The tracks can be molded into the frame or alternatively secured onto the sides to accept a door.

BRIEF DESCRIPTION OF DRAWINGS

The features of the present invention are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
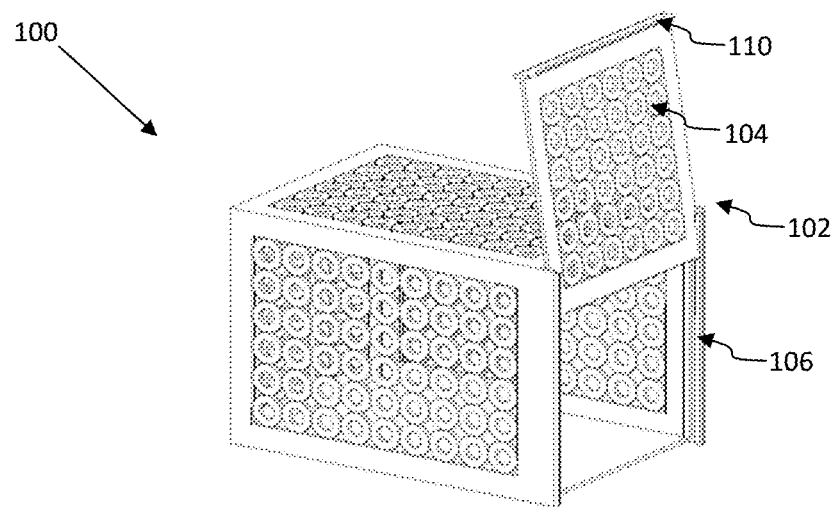
FIG. 1 is a door and track assembly, with the door panel resting on the frame in an open position.
Figure 2:
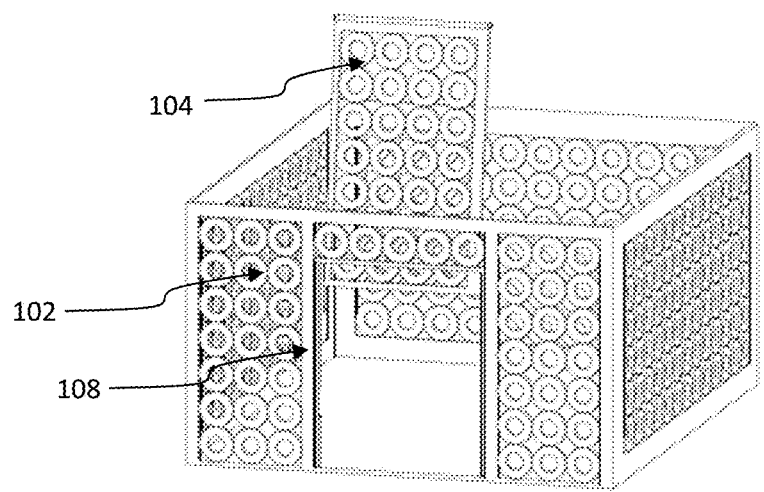
FIG. 2 depicts alternate version of door and track assembly.

FIG. 1 and FIG. 2 is a box 100 having a door and track assembly 102, according to an illustrative embodiment of the present invention. The figure shows a door panel 104 and a pair of tracks 106. Going forward in the description, the use of words: pair of tracks, track and tracks will be interchangeably used. The door panel 104 is configured to move on the tracks 106 between a closed position and an open position using the door and track assembly 102. As shown in FIG. 1 and FIG. 2, the door 104 can vary in size relative to the front panel of the box. An edge 110 aids the user to grip the door for ease in opening or closing. The door and box assembly 102 is configured to keep the box 100 in an open and closed position as per the requirements of the user.

In an embodiment of the invention, the box is used as a pet carrier, such as a dog or cat carrier. Though, it should be appreciated by a person skilled in the art that the door and track assembly can also be used in many other applications.

Figure 3:
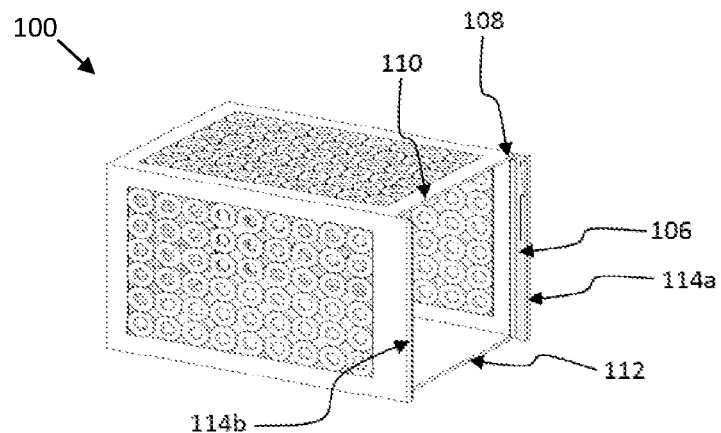
FIG. 3 depicts various parts of the frame of the door and track assembly.
Figure 4:
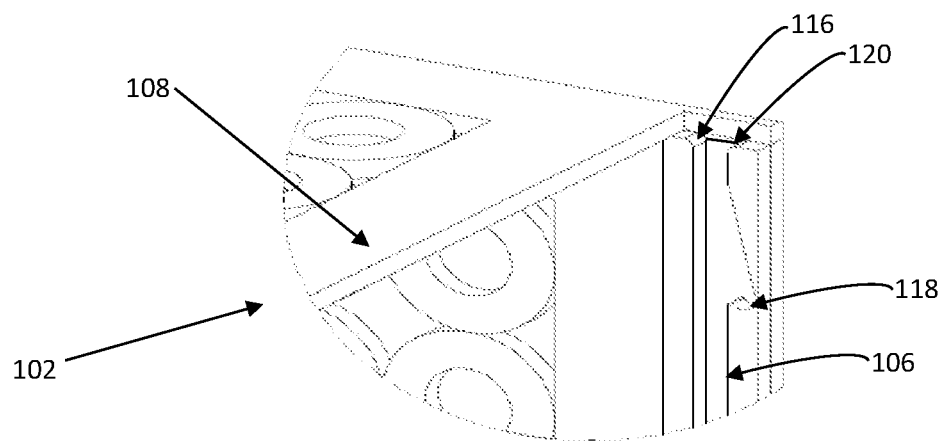
FIG. 4 is a magnified view of the slot present in the track of the assembly.

The various parts of the door and track assembly 102 are shown in FIG. 3 according to an illustrative embodiment of the present invention. The assembly includes a frame 108 and the door panel 104. The frame 108 includes a top edge 110, a bottom edge 112 and opposing edges 114a and 114b. The opposing edges 114 include built in tracks 106. The uppermost end of the track 106 further includes an indentation 116 as shown in FIG. 4. The indentation 116 and shelf 120 are provided to be flush with the mating of the door panel 104, the edge 110, and frame 108.

FIG. 4 shows a magnified view of the upper section of the track 106 having a slot 118. The tracks 106 are provided with an integrally formed slot 118. As shown, the slot 118 is formed in a U shape or a hook like structure. The slot may be in any shape which can accept the edge of the door and keep the door flush or tilted against the box. The door panel 104 is configured to move between an open position and a closed position along the tracks 106. To open the box 100, the door panel 104 is moved manually and slid into the tracks 106 allowing it to rest in the slot 118 when open. This is the open position of the door panel 104. The door panel 104 can then be easily disengaged from slot 118 and slid down the track using one hand to maneuver it to the closed position, thereby meeting the bottom edge 112.

Figure 5:
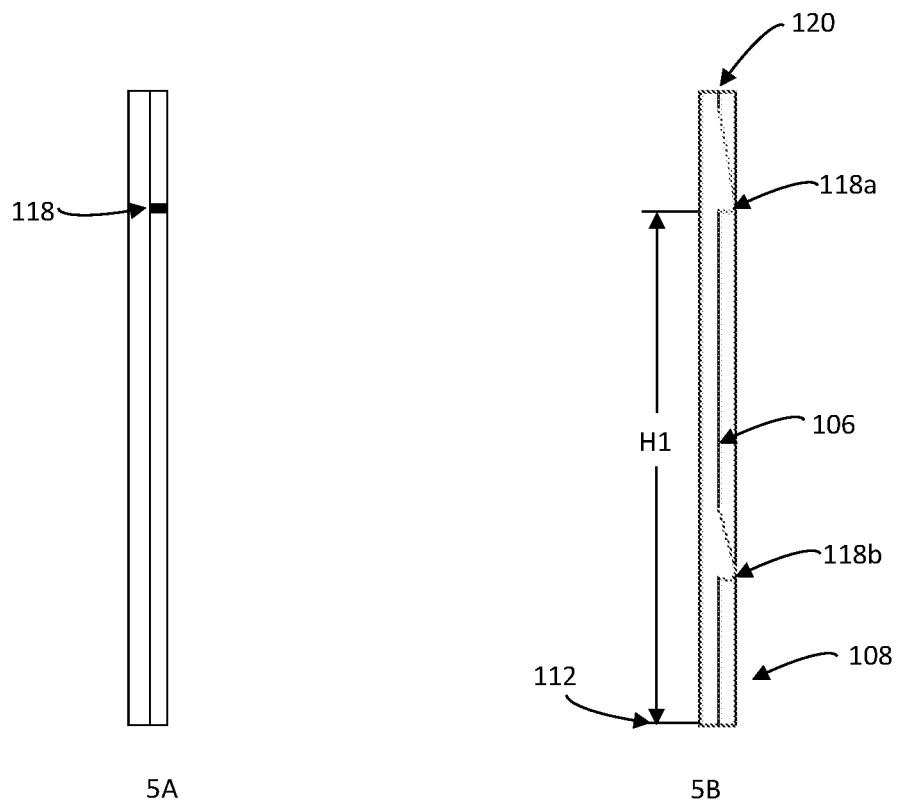
FIG. 5 illustrates dimensions of the slot formed integrally in the track.

A front view and a side view of the tracks 106 along with the slot 118 is shown in FIG. 5A and FIG. 5B respectively, according to an illustrative embodiment of the disclosure. The slot 118 is located at a height H1 measured from the bottom edge 112. It should be appreciated that in an embodiment the height H1 is chosen in such a way that the height H1 is greater than about two thirds of the height of the frame. Or alternatively, slot 118 is located in about the top ⅓ portion of the track 106. It should also be appreciated that in another embodiment the position of the slot 118 can be placed at about the half way portion of track 106, or alternatively H1 is chosen in such a way that the height H1 is less than the two thirds of the height of the frame. The slot can be positioned wherever the user desires on the box, recognizing that its position limits the space of the door opening for the box. At the top ⅓ of the track, the door opening can be completely opened for entry of a pet or item. In another embodiment various slots 118, that is at least 2, and as many as desired and can reasonably fit on the track, can be placed along the track to allow the user alternate open positions of the door.

In an alternate embodiment of the present invention, the tracks 106 and edges of the frame 108 are not integral and are made of at least one of resin, plastic, wood and a metal. It should be appreciated that the tracks 106 can be a separate piece of hardware for the box 100, and can be secured or adhered to the frame 108 using standard methods, such as glue or welding. The track can also be attached or secured to the walls of the box with screws or nails. From an aesthetic and simplistic position, it is preferred to have the tracks be integral with the box such that the track is carved or built in to the sides to accommodate the edges of the door panel.

Figure 6:
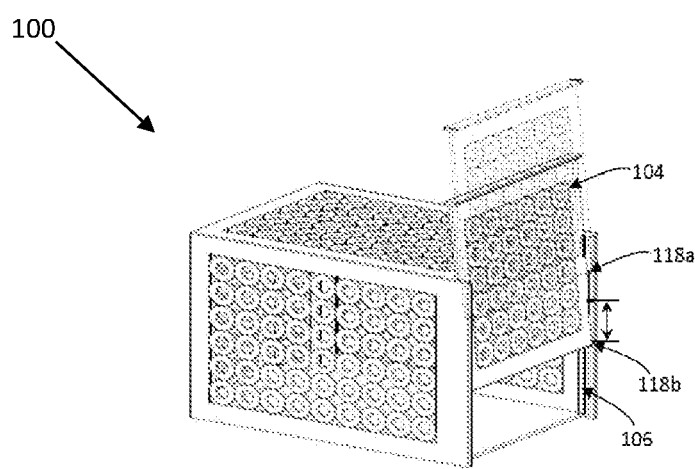
FIG. 6 illustrates multiple open positions of the door panel.

The present invention discloses a simple sliding door and track assembly for use with a box or carrier. The assembly can be constructed such that the tracks are integral with the sides, or secured thereto. A slot is located at a position desirable to the user such that the door is opened sufficiently for the user's needs. This can be anywhere from about ½ to ⅓ of the top portion of the track, allowing the door to be open about ½ to all of the box opening area. It is possible and conceived for the slot to be adjustable in its position on the track or for there to be fixed multiple slots 118A and 118B on the track to accommodate various open positions of the door as shown in FIG. 6. An adjustable slot 118B can be moved up and down the track and secured by means known in the art such as screws or nails, pegs and holes, or the like. The assembly described herein allows for a simple mechanism, aesthetic to the eye, no extraneous (or minimal) hardware exposed, and simple to use.

The door can be designed with a lip or edge for ease in handling or alternatively with a slot or handle to place fingers into for ease in lifting. The edge, slot, or handle can be in the top center position or wherever a user desires. It can be integral with the door or separate item attached and secured to the door for ease in opening and closing the door. The entire box 100 can have handles as desired for ease in carrying.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A door and box assembly comprising:
a box having six faces, wherein a front vertical face of the six faces has an opening to include a door track and hook assembly, the door track and hook assembly comprising:
a frame including a top edge, a first side edge, a second side edge, and a bottom edge, wherein the first side edge and the second side edge are opposing side edges, wherein the opposing side edges are laid between the top edge and the bottom edge, and wherein the opposing side edges include a pair of tracks that are integrally built in the opposing side edges and vertically aligned;
a panel capable of slidable engagement with the pair of tracks, wherein a first side edge and a second side edge of the panel engage with, and slide in, the pair of tracks, and wherein the panel forms a door for the opening;
a plurality of slots spaced apart and integrally built in each track of the pair of tracks to accommodate a plurality of open positions of the panel, wherein a bottom edge of the panel rests in the plurality of slots to provide the plurality of open positions; and
an indentation formed in an uppermost section of the pair of tracks, wherein the indentation is configured to provide a resting place for the panel in an open position of the plurality of open positions of the door track and hook assembly.

2. The door and box assembly of claim 1, wherein the pair of tracks are made of one of resin, plastic, wood, and metal.

3. The door and box assembly of claim 1, wherein a slot of the plurality of slots is in the shape of a hook.

4. The door and box assembly of claim 1, wherein a slot of the plurality of slots is U-shaped.

5. The door and box assembly of claim 1, wherein a slot of the plurality of slots is located in an uppermost portion of the pair of tracks, and wherein the uppermost portion is one-third of the pair of tracks.

6. The door and box assembly of claim 1, wherein a slot of the plurality of slots is at a height measured from the bottom edge which is greater than two-thirds height of the frame.

7. The door and box assembly of claim 1, wherein a slot of the plurality of slots is at a height measured from the bottom edge which is less than two-thirds height of the frame.

8. The door and box assembly of claim 1, wherein the panel has a handle mechanism to move the panel up and down.

9. The door and box assembly of claim 1, wherein the handle mechanism is a slot, integral with the panel.

10. The door and box assembly of claim 1, wherein the door and hook assembly is devoid of any additional hardware.

\* \* \* \* \*